US009189611B2

(12) United States Patent
Wässingbo

(10) Patent No.: US 9,189,611 B2
(45) Date of Patent: Nov. 17, 2015

(54) ADAPTING CONTENT AND MONITORING USER BEHAVIOR BASED ON FACIAL RECOGNITION

(71) Applicant: Tomas Wässingbo, Lund (SE)

(72) Inventor: Tomas Wässingbo, Lund (SE)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 13/761,485

(22) Filed: Feb. 7, 2013

(65) Prior Publication Data

US 2014/0223548 A1   Aug. 7, 2014

(51) Int. Cl.
  *G06F 12/00* (2006.01)
  *G06F 21/32* (2013.01)
  *H04N 21/258* (2011.01)
  *H04N 21/4415* (2011.01)
  *H04N 21/442* (2011.01)
  *H04N 21/4223* (2011.01)
  *H04N 21/45* (2011.01)
  *H04N 21/4788* (2011.01)

(52) U.S. Cl.
  CPC .......... *G06F 21/32* (2013.01); *H04N 21/25875* (2013.01); *H04N 21/4415* (2013.01); *H04N 21/44204* (2013.01); *H04N 21/4532* (2013.01); *H04N 21/4223* (2013.01); *H04N 21/4516* (2013.01); *H04N 21/4788* (2013.01)

(58) Field of Classification Search
  CPC ............................... G06F 21/31; G06F 21/575
  USPC .................................................. 726/5, 18–19
  See application file for complete search history.

(56) References Cited

U.S. PATENT DOCUMENTS

| 8,261,090 | B1 * | 9/2012 | Matsuoka ..................... 713/186 |
| 2001/0028748 | A1 * | 10/2001 | Sato et al. ..................... 382/239 |
| 2009/0138805 | A1 | 5/2009 | Hildreth |

(Continued)

FOREIGN PATENT DOCUMENTS

| EP | 2518917 A1 | 10/2012 |
| WO | 2012040385 A1 | 3/2012 |

OTHER PUBLICATIONS

Invitation to Pay Additional Fees; May 16, 2014; issued in International Patent Application No. PCT/IB2014/000115.

(Continued)

*Primary Examiner* — Anthony Brown
(74) *Attorney, Agent, or Firm* — James C. Edwards; Moore & Van Allen PLLC

(57) ABSTRACT

The invention is directed to systems, methods and computer program products for adapting content and monitoring user behavior based on facial recognition. An exemplary method comprises: receiving, at a first device, image data from a second device; determining whether the image data substantially matches second image data in a database of image data; in response to determining the image data substantially matches the second image data, determining an account associated with the image data; determining a first set of data associated with the account; and transmitting the first set of data to the second device, wherein the first set of data is used to configure an application being executed on the second device.

20 Claims, 6 Drawing Sheets

(56) References Cited

U.S. PATENT DOCUMENTS

| | | | |
|---|---|---|---|
| 2009/0144071 A1* | 6/2009 | Saito et al. | 705/1 |
| 2009/0290787 A1* | 11/2009 | Stevens et al. | 382/154 |
| 2011/0292181 A1 | 12/2011 | Acharya et al. | |
| 2012/0072996 A1* | 3/2012 | Svendsen et al. | 726/28 |
| 2012/0290648 A1 | 11/2012 | Sharkey | |
| 2012/0328202 A1* | 12/2012 | Tian et al. | 382/209 |
| 2013/0015946 A1 | 1/2013 | Lau et al. | |
| 2014/0046837 A1* | 2/2014 | Metral | 705/41 |

OTHER PUBLICATIONS

Weinstein, Eugene et al., "Handheld Face Identification Technology in a Pervasive Computing Environment", Technical report, Jan. 1, 2002, pp. 1-7, XP055042488, Retrieved from the Internet: URL:http://cbcl.mit.edu/projects/cbcl/publications/ps/pervasive-2002.pdf [retrieved on Oct. 26, 2012].

International Search Report and Written Opinion; Jun. 27, 2014; issued in International Patent Application No. PCT/IB2014/000115.

* cited by examiner

ADAPTING CONTENT AND MONITORING USER BEHAVIOR BASED ON FACIAL RECOGNITION

BACKGROUND

A single computing device may be used by different users. There is a need to customize a user's experience associated with using the device based on an identification of the user.

BRIEF SUMMARY

Embodiments of the invention are directed to systems, methods and computer program products for adapting content and monitoring user behavior based on facial recognition. An exemplary method comprises: receiving, at a first device, image data from a second device; determining whether the image data substantially matches second image data in a database of image data; in response to determining the image data substantially matches the second image data, determining an account associated with the image data; determining a first set of data associated with the account; and transmitting the first set of data to the second device, wherein the first set of data is used to configure an application being executed on the second device.

In some embodiments, the first set of data is transmitted to the second device without prompting a user associated with the account to input a username or an authentication credential on to the second device.

In some embodiments, the second device comprises at least one of a television, a laptop computer, a smart screen, a tablet computer, a desktop computer, an electronic reader, a scanner, a portable media player, a mobile computing device, a mobile phone, a device at a movie theater, a gaming device, or a kiosk.

In some embodiments, the second device: captures the image data when a user associated with the account accesses the second device or initiates an application on the second device, and transmits the captured image data to the first device.

In some embodiments, the second device determines whether a quality of the image data is equal to or greater than a predetermined quality level.

In some embodiments, the method further comprises transmitting a message to the second device, the message prompting a user to confirm the determined account.

In some embodiments, the first set of data comprises a media consumption history.

In some embodiments, the first set of data comprises recommended media.

In some embodiments, the method further comprises transmitting a message to the second device, the message prompting a user associated with the account to input an authentication credential on to the second device; receiving the authentication credential from the second device; determining whether the authentication credential is a correct authentication credential; and in response to determining the authentication credential is the correct authentication credential, transmitting a second set of data to the second device, wherein the second set of data is used to further configure the application being executed on the second device.

In some embodiments, the first set of data is based on a type of the second device.

In some embodiments, the application comprises a user interface, and wherein the database is associated with a service provider.

In some embodiments, the image data comprises facial image data.

In some embodiments, the method further comprises: determining the image data comprises first sub-image data associated with a first user and second sub-image data associated with a second user; determining a first set of sub-data associated with the first user; determining a second set of sub-data associated with the second user; determining a common set of data based on the first set of sub-data and the second set of sub-data; and transmitting the common set of data to the second device.

In some embodiments, the method further comprises receiving activity data performed on the second device; and storing the received activity data, wherein the first set of data is based on the received activity data.

In some embodiments, the received activity data is used to update a profile associated with the account.

In some embodiments, the account is associated with a first user, and wherein the received activity data is communicated to a second user.

In some embodiments, the received activity data is associated with both a first user and a second user, and the second device: determines presence of the first user and the second user during performance of the activity, and in response to determining the second user is no longer present after a period of time, recording the period of time.

In some embodiments, the method further comprises determining the second user is accessing a third device; and prompting the second user to perform a remainder of the activity on the third device, the remainder of the activity being based on the recorded period of time.

In some embodiments, an apparatus is provided for adapting content and monitoring user behavior based on facial recognition. The apparatus comprises a memory; a processor; and a module stored in the memory, executable by the processor, and configured to: receive image data from a second apparatus; determine whether the image data substantially matches second image data in a database of image data; in response to determining the image data substantially matches the second image data, determine an account associated with the image data; determine a first set of data associated with the account; and transmit the first set of data to the second apparatus, wherein the first set of data is used to configure an application being executed on the second apparatus.

In some embodiments, a computer program product is provided for adapting content and monitoring user behavior based on facial recognition. The computer program product comprises a non-transitory computer-readable medium comprising a set of codes for causing a first device to: receive image data from a second device; determine whether the image data substantially matches second image data in a database of image data; in response to determining the image data substantially matches the second image data, determine an account associated with the image data; determine a first set of data associated with the account; and transmit the first set of data to the second device, wherein the first set of data is used to configure an application being executed on the second device.

In some embodiments, another method is provided for adapting content and monitoring use behaviors based on facial recognition. The method comprises: transmitting facial image data to a second device; in response to transmitting the facial image data to the second device, receiving a first set of data from the second device, the first set of data being associated with an account associated with the facial image data; and configuring, based on the first set of data, an application being executed on the first device.

In some embodiments, another apparatus is provided for adapting content and monitoring use behaviors based on facial recognition. The apparatus comprises a memory; a processor; and a module stored in the memory, executable by the processor, and configured to: transmit facial image data to a second device; in response to transmitting the facial image data to the second device, receive a first set of data from the second device, the first set of data being associated with an account associated with the facial image data; and configure, based on the first set of data, an application being executed on the first device.

In some embodiments, another computer program product is provided for adapting content and monitoring user behavior based on facial recognition. The computer program product comprises a non-transitory computer-readable medium comprising a set of codes for causing a first device to: transmit facial image data to a second device; in response to transmitting the facial image data to the second device, receive a first set of data from the second device, the first set of data being associated with an account associated with the facial image data; and configure, based on the first set of data, an application being executed on the first device.

BRIEF DESCRIPTION OF THE DRAWINGS

Figure 1:
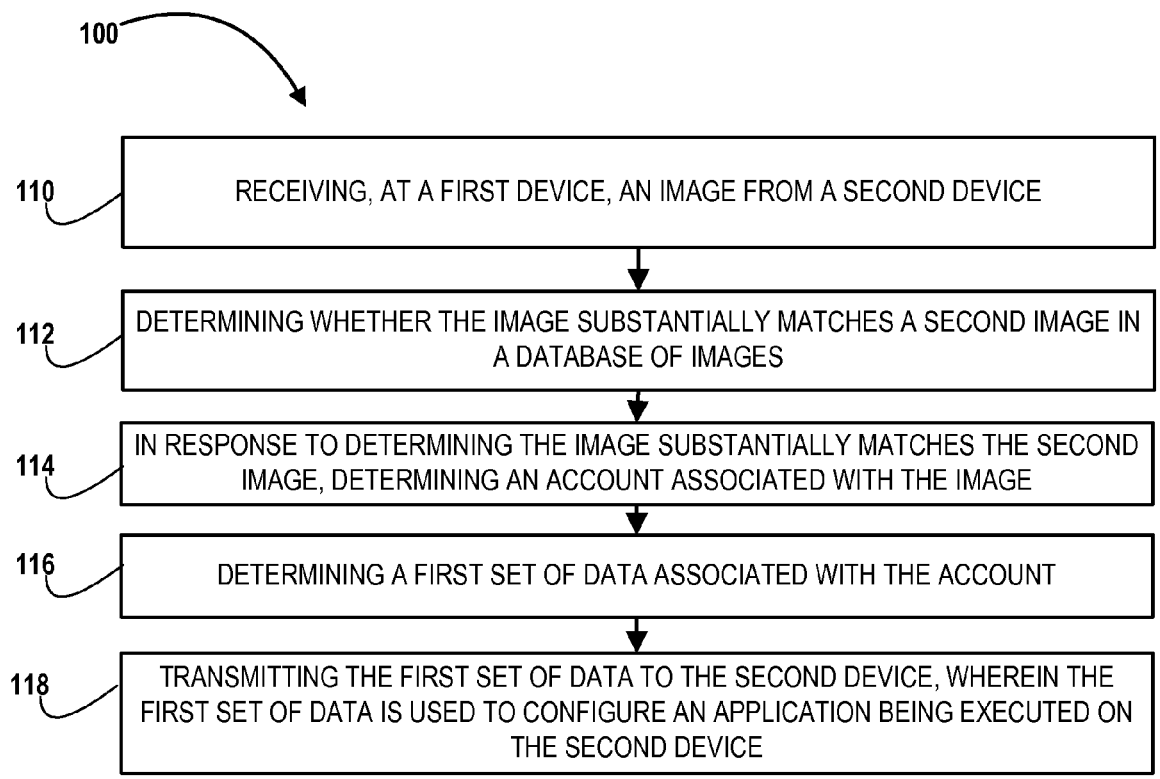
Figure 2:
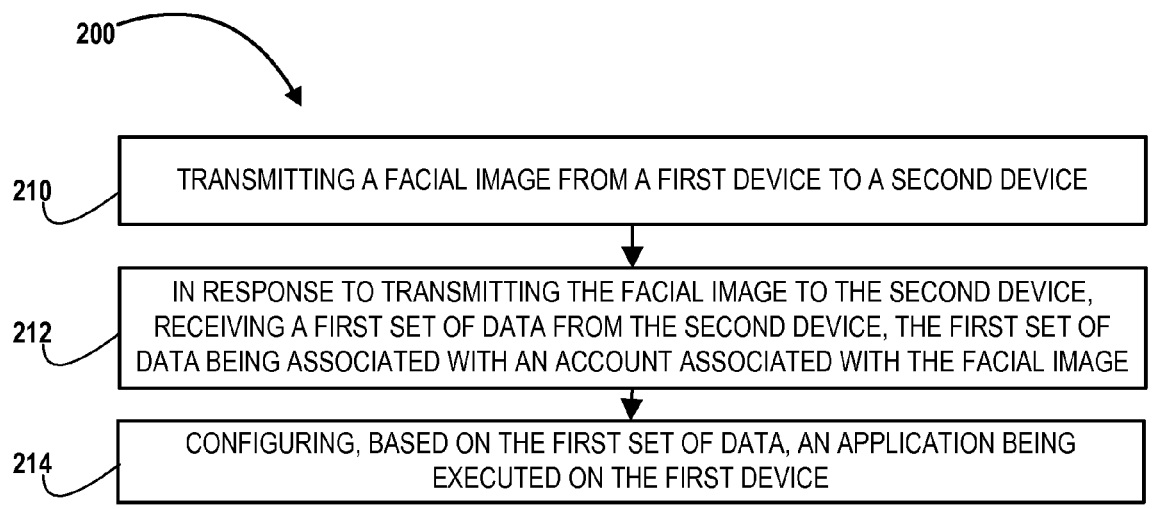
Figure 3:
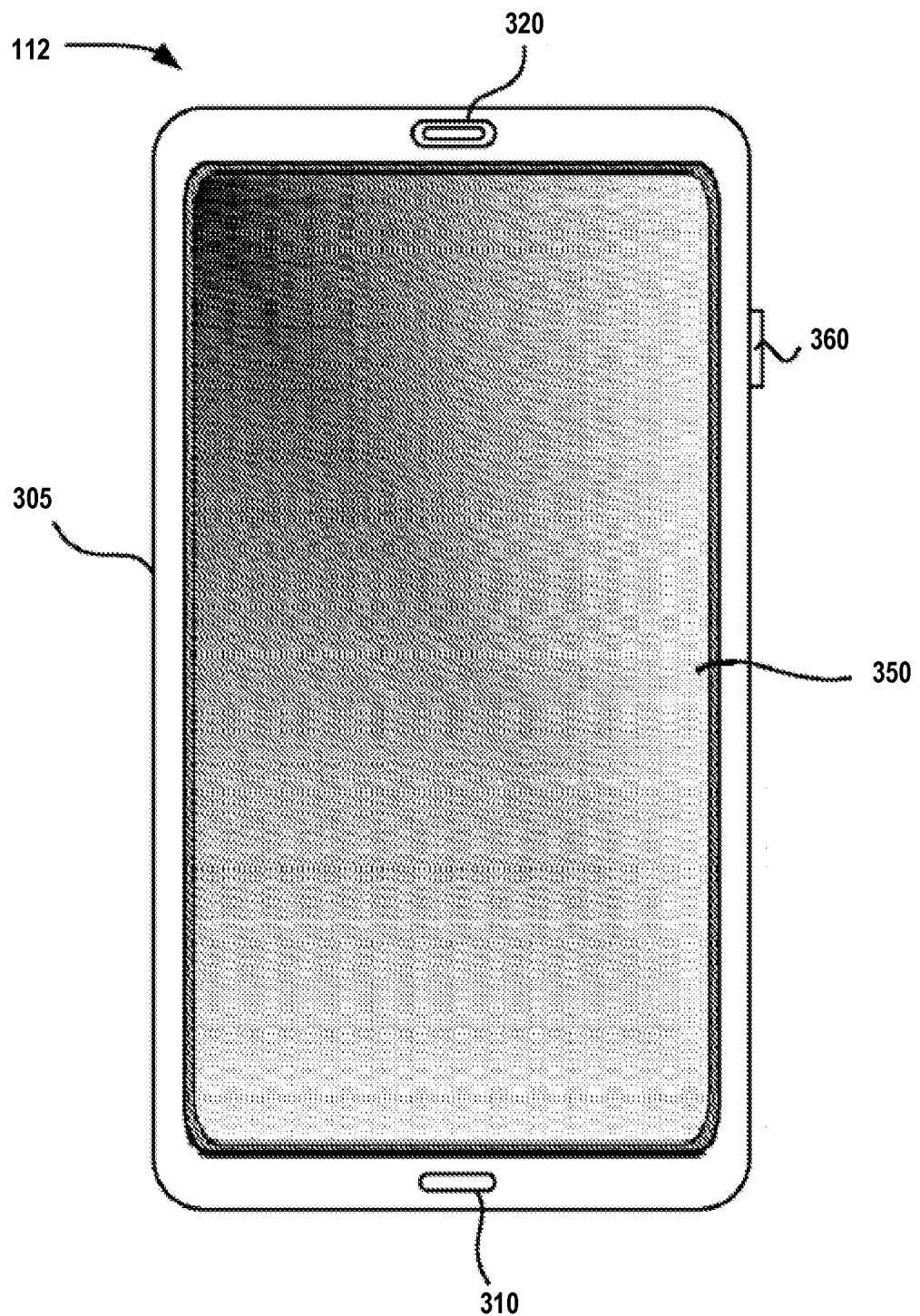
Figure 4:
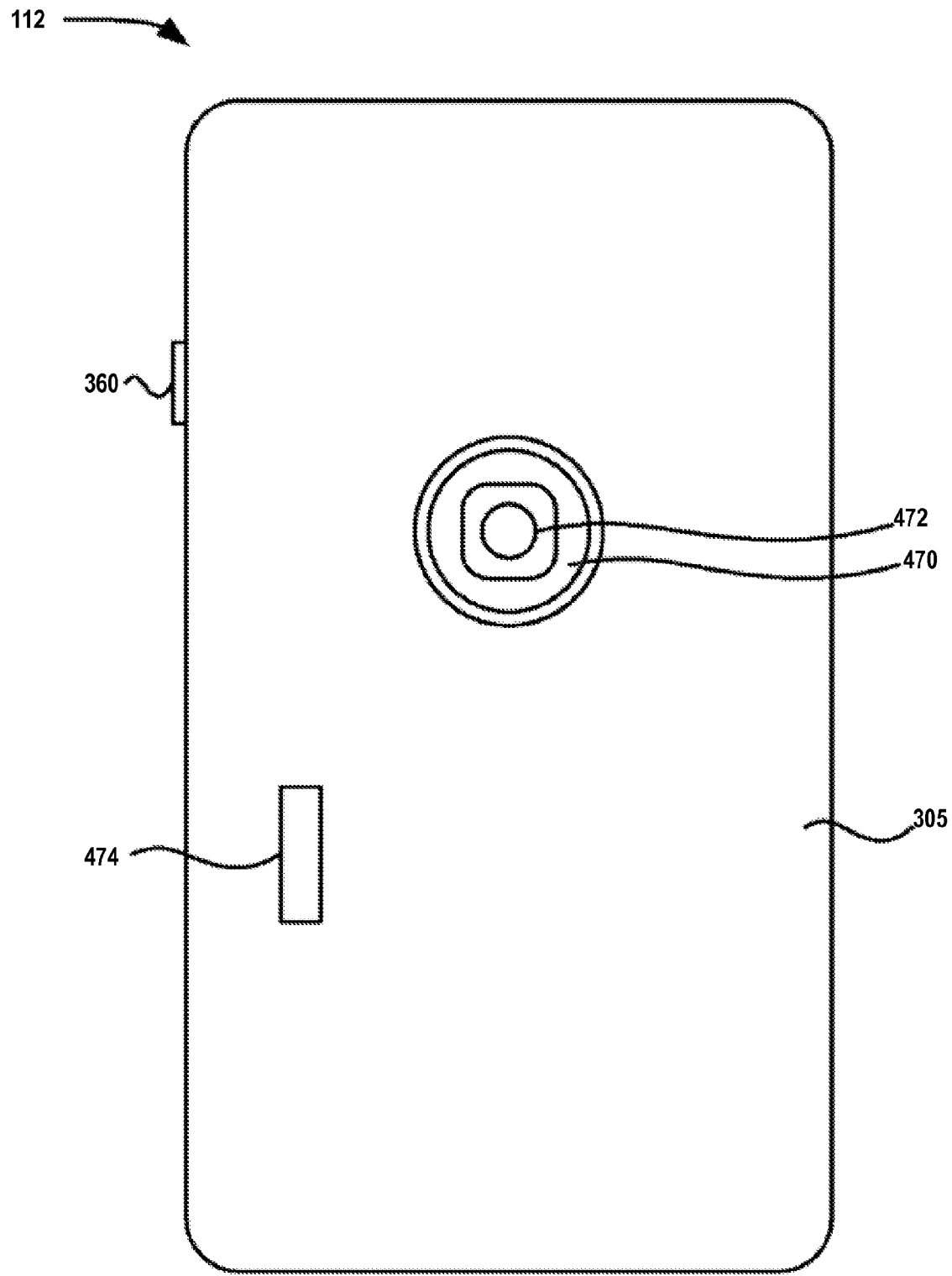
Figure 5:
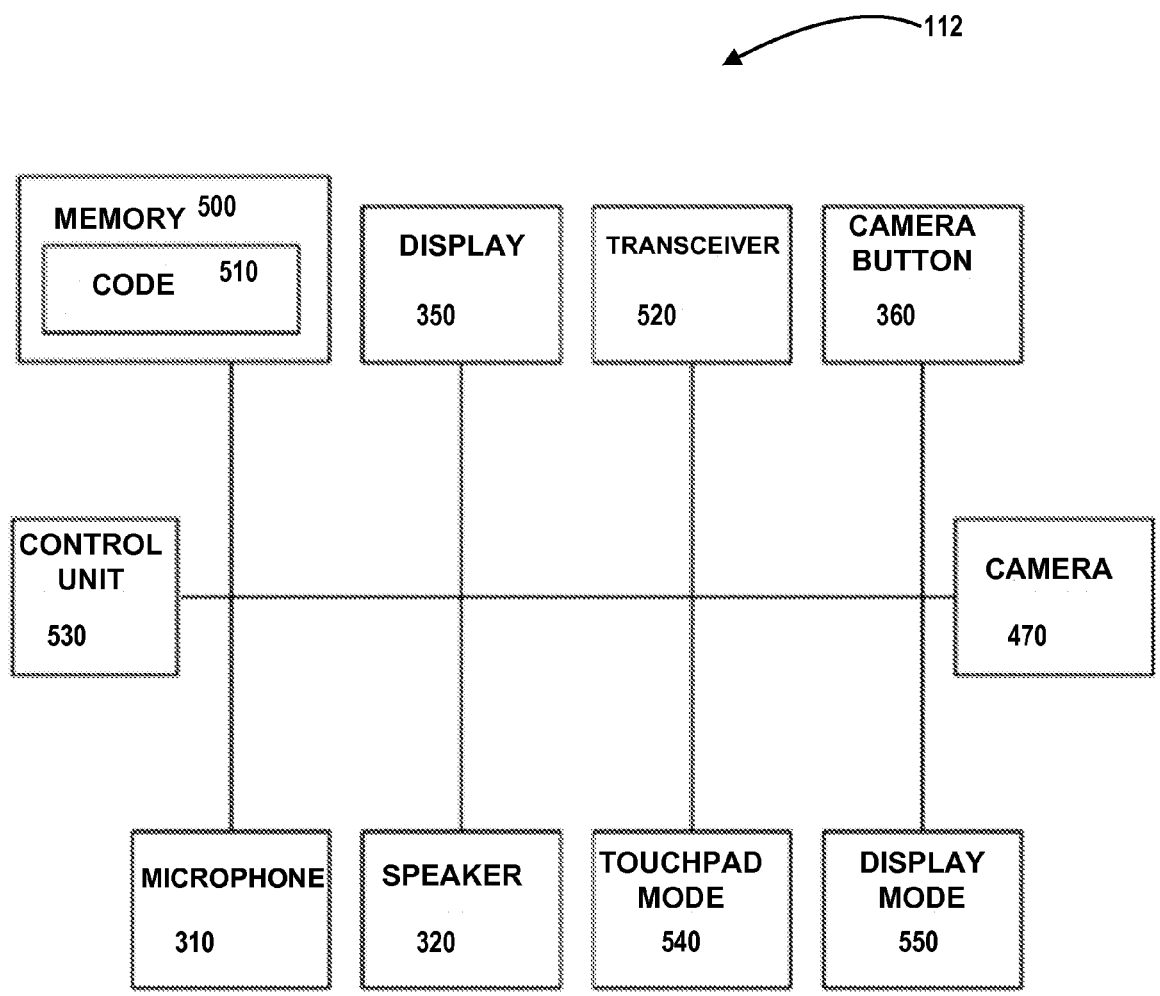
Figure 6:
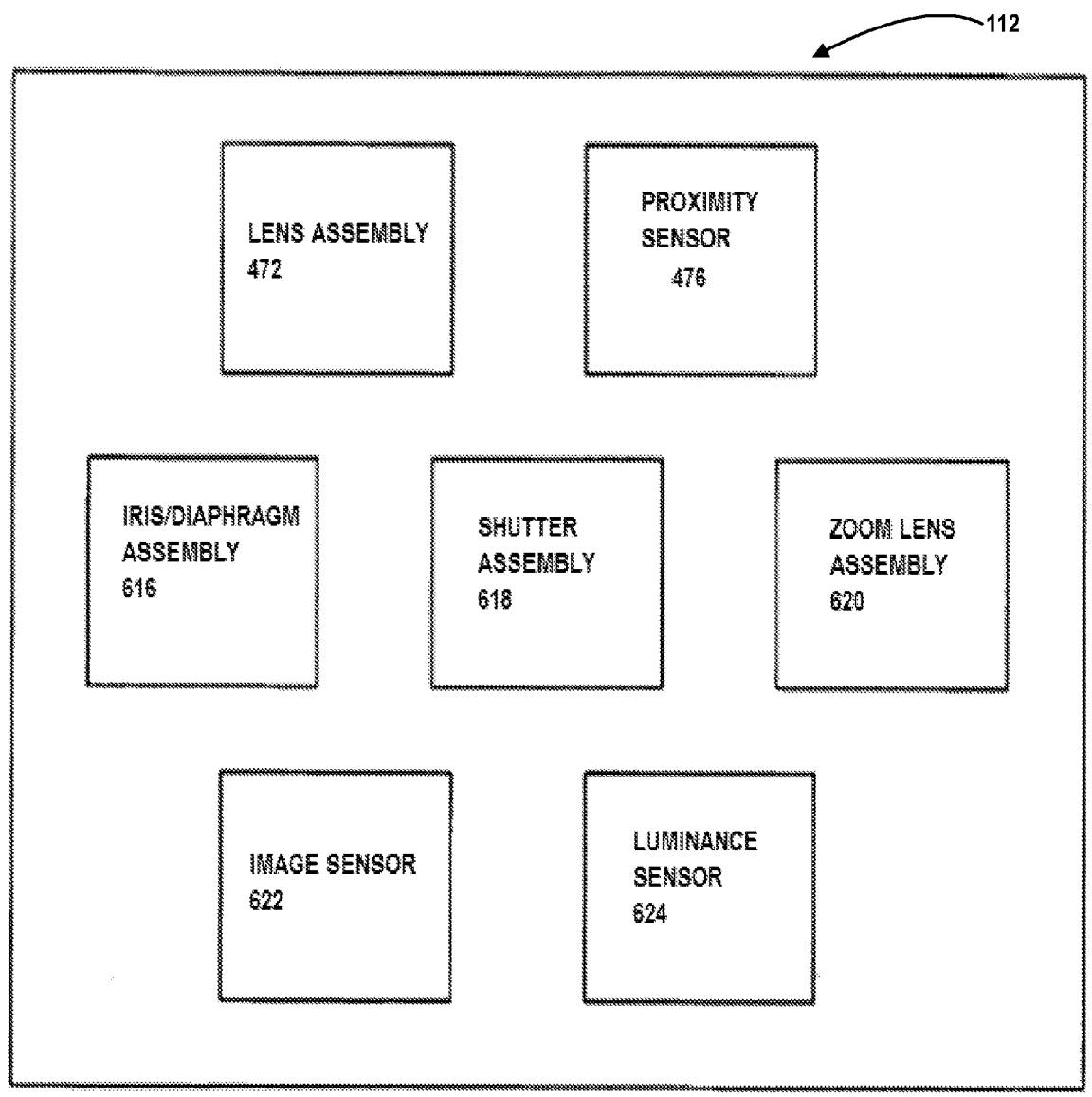

Having thus described embodiments of the invention in general terms, reference will now be made to the accompanying drawings, where:

FIG. 1 is an exemplary process flow for adapting content and monitoring user behavior based on facial recognition, in accordance with embodiments of the present invention;

FIG. 2 is another exemplary process flow for adapting content and monitoring user behavior based on facial recognition, in accordance with embodiments of the present invention;

FIG. 3 is an exemplary image-capturing device, in accordance with embodiments of the present invention;

FIG. 4 is a diagram illustrating a rear view of exemplary external components of the image-capturing device depicted in FIG. 3, in accordance with embodiments of the present invention; and FIG. 5 is a diagram illustrating exemplary internal components of the image-capturing device depicted in FIG. 3, in accordance with embodiments of the present invention;

FIG. 6 is a diagram illustrating components of an exemplary camera depicted in FIG. 5, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for adapting content and monitoring user behavior based on facial recognition. The present invention identifies the user who is accessing a computing device, and presents, on the computing device, customized content based on the identified user. The present invention identifies the user based on a captured image of the user, and without requiring the user to manually input a username (and/or an authentication credential). As used herein, inputting at least one of a username and/or an authentication credential may be referred to as "logging in." Additionally, the present invention collects and monitors the user's activity on the computing device. Examples of computing devices include televisions, laptop computers, smart screens, tablet computers or tablets, desktop computers, e-readers, scanners, portable media players, mobile computing devices (e.g., mobile phones), image capturing devices (e.g., cameras), display screens (or other computing devices) at movie theaters, gaming devices, kiosks, or other portable or non-portable computing or non-computing devices.

When a user accesses a computing device, the device may determine that a user has accessed the device. In response to determining the user has accessed the device, the device may prompt the user to register the user's image. The device may present the user with benefits associated with registering the user's image. For example, the device may inform the user that the information presented to the user on the device (or any other device) will be customized based on the user's preferences if the user register's the user's image. Additionally, the device may inform the user that the user's image may serve as an identification and/or authentication mechanism in the future so that the user does not need to provide a username and/or password to access the user's information and/or initiate an application on the device (or any other device). In some embodiments, the device prompts the user to register the user's image when the user accesses an application or service (e.g., a website, a mobile application, or the like) provided by a service provider on the device.

Once the user accepts the offer to register the user's image, the device captures an image of the user's face. The device may provide instructions to the user for orienting the user's face towards a camera associated with the device. The camera may be either internal or external to the device. Once the device determines that the user's face is oriented towards the camera, the device either captures an image of the user's face or prompts the user to select an option to capture the image of the user's face. The device may then determine whether the quality of the image is acceptable (e.g., whether the sharpness of the image is equal to or greater than a predetermined degree of sharpness). Once the device determines that the quality of the image is acceptable, the device transmits the image to an external server (e.g., a server associated with the device or associated with an application being executed on the device). If the quality of the image is not acceptable, the device prompts the user to capture another image. In alternate embodiments, the device may allow a user to upload a stored image. The stored image may have been captured by any device.

The external server stores the image in a database. The external server associates the image with at least one of a particular device (e.g., based on device identification information received from the device), a particular user or account (e.g., based on user identification information received from the user), a particular location (e.g., based on geographical (global positioning system GPS information) or network information (Internet Protocol (IP) address associated with the device), or a particular application (e.g., a social network application, a search application, a media application, etc.). Therefore, for example, a user may provide his/her name or a username (the user identification information) to the device. This user information is transmitted to the external server and the external server associates the image with the user identification information. The user identification information may be transmitted to the external server before, after, or substantially simultaneously with the image. The external server described herein may be a cloud-based external server.

When the user accesses a device (e.g., any device) in the future or initiates an application on the device or when the user is detected by a camera associated with the device, the device prompts the user to capture an image of the user's face. The process of capturing the image starts with the device providing instructions to the user for orienting the user's face towards a camera associated with the device. Once the device determines that the user's face is oriented towards the camera, either the device captures an image of the user's face or prompts the user to select an option to capture the image of the user's face. The device may determine whether the quality of the image is acceptable (e.g., whether the sharpness of the image is equal to or greater than a predetermined degree of sharpness). Once the device or the service provider determines that the quality of the image is acceptable, the device transmits the image to an external server (e.g., a server associated with the device or associated with an application being executed on the device). The external server scans or searches a database of images to find an image that substantially matches the received image. Therefore, the external server maps the received image to an image stored in the database. If the external server does not find an image that substantially matches the received image, the external server transmits an error message to the device. If the external server finds an image that substantially matches the received image, the external server then determines user information associated with the image. For example, the external server determines a username (e.g., Username1) associated with the image. The external server then transmits a message to the device. The message comprises a prompt that is presented on the device (e.g., "Are you Username1?"). The user responds to the prompt by either selecting 'Yes' or 'No.' In alternate embodiments, the device captures an image of the user's face without prompting the user and/or without providing instructions to the user. In such embodiments, the device may be configured to periodically capture an image, or may be configured to capture an image of a user when the device detects the presence of the user in the proximity of the device (e.g., the device determines a user is situated at a distance less than or equal to a predetermined distance from the device). Therefore, the device may capture the image of the user's face without the user knowing that the device has captured an image of the user's face.

In some embodiments, when the user selects 'Yes,' the external server transmits a first tier of data to the device (and/or activates a first tier of services (or application features) accessible by the user via the device). For example, the first tier of data may comprise bookmarks, media consumption (e.g., movie viewing) history, or webpage viewing history associated with the identified user (and not associated with the device). As a further example, the first tier of data may comprise a first set of user preferences that are applied to the user interface on the device.

Additionally, in addition to the prompt, the user may be prompted to provide an authentication credential (e.g., a username and/or a password). Once the user provides the authentication credential, the authentication credential is transmitted to the external server. Once the external server verifies the authentication credential, the external server transmits a second tier of data to the device (and/or activates a second tier of services) accessible to the user via the device. The second tier of data may comprise more sensitive or personal data compared to the first tier of data. The second tier of services (or application features) may comprise more sensitive or personal services comprises compared to the first tier of services.

As a further example, the second tier of data may comprise a second set of user preferences that are applied to the user interface on the device.

Therefore, the present invention enables a user to use any device and obtain access to his/her data, preferences, services, etc. Additionally, the data transmitted by the external server to the device depends on the type of device. For example, if the external server determines that the device is a television, the external server transmits data associated with media previously consumed by the user or recommended media based on previous user activity.

Additionally, either prior to or after identifying the user based on verifying the user's image (and/or the user-provided authentication credential), the device (or an application running on the device) may seek permission from the user to monitor the user's behavior or activity on the device. If the user permits the device to monitor the user's activity, the device monitors the user's activity and records the user's activity (e.g., movies viewed by the user, advertisements viewed and/or skipped by the user). The device may transmit the user's activity data to the external server. The external server may store the data, analyze the data to determine trends, and use the data associated with the user's activity to configure or customize data (e.g., media content, advertisements, etc.) presented to the user in the future. In alternate embodiments, the device monitors and records the user's activity without seeking permission from the user.

The monitored activity data may be used for one or more applications (e.g., applications previously specified by the user). For example, the monitored activity data may be used by an application (e.g., a social network application) to update the user's profile (e.g., a social network profile) in real-time (or near real-time). The device or the external server may have previously sought permission from the user to use the monitored activity data for one or more purposes previously determined by the user. As a further example, the monitored activity data may be shared among different users. For example, if a first user is watching a movie on a first device, this activity data is communicated to a second user. The device or the external server may have previously sought permission from the user to share the user's activity data with other users determined by the user.

In some embodiments, the device may determine that the image captured by the device comprises facial images associated with more than one user (e.g., two users). In such embodiments, the external server may receive the image from the device and determine that that the image comprises a first face and a second face. The external server uses the process described herein to determine the identity of the first user associated with the first face and the second user associated with the second face. Once the identities of the first user and the second user have been determined by the external server (and optionally verified based on responses to prompts presented to the first user and second user), the external server transmits data associated with both the first user and the second user to the device. For example, the device may be a television, and the external server may transmit to the device recommended media (e.g., movies) that are associated with the preferences associated with both the first user and the second user. Therefore, the data may comprise recommended movies or recommended movie genres or categories based on the preferences associated with both the first user and the second user.

Additionally or alternatively, the external server may segregate the data based on the identity of the first user and the identity of the second user. Therefore, the data transmitted to the device may comprise first data associated with the first user (e.g., a recommended movie (or movie category or genre) based on the preferences associated with the first user) and separate second data associated with the second user (e.g., a recommended movie (or movie category or genre) based on the preferences associated with the second user).

Assume the first user and the second user begin watching a movie on a device (e.g., a television). The device may continuously monitor the presence of the first user and the second user during the movie. The device may determine a point in time when the second user is not present in the captured image. The device records this time as the time of departure of the second user, and transmits this information to the external server. If the second user returns to a second device after a period of time and initiates a movie-watching application on the second device, the second device communicates with the external server to identify the second user and prompts the second user to start watching the movie that the second user did not finish watching earlier on the first device. If the second user chooses to start watching this movie, the movie begins from the point in time (or a predetermined period (e.g., a few minutes) prior to the point in time) when the second user was no longer detected by the first device (e.g., the second user's departure time).

In some embodiments, the device captures the image of the user when the user initiates activity on the device. In such embodiments, the image of the user is mapped to an image stored in an external database so that each application subsequently initiated by the user can be customized based on the user's prior activity or pre-set preferences previously specified by the user. In other embodiments, the device captures the image of the user when the user initiates a particular application on the device. In such embodiments, the user interface associated with the particular is customized or adapted based on the identity of the user. In embodiments where the user's identity cannot be determined, the initiated application presents a generic user interface.

The device described herein may be located anywhere. Exemplary locations include a home, an office, an airport, a kiosk, a café, a movie theater, or the like. As an example, a device that is used by multiple users at a home, office, airport, kiosk, or café can adapt the usage of the device (e.g., number and type of applications that can be executed on the device, data/preferences associated with each executable application, etc.) based on determining the identity of the user. As a further example, a display device at a movie theater can suggest movies (or movie types/genres) or adapt advertisements played during movies based on the identities of the users who are watching the movie (e.g., the users seated in the movie theater). As used herein, a "movie" is an example of content or data. Therefore, a "movie" may refer to any type of content such as audio data, visual data, audiovisual data, still image data, text, numbers, or the like.

The device (e.g., a computing device) described herein comprises one or more image-capturing devices. In some embodiments, the device comprises a display, while in other embodiments, the device communicates with an external display. In some embodiments, the device comprises an image-capturing device (e.g., a camera), while in other embodiments, the device communicates with one or more external image-capturing devices. An image-capturing device described herein may capture still images (with a predetermined gap of time between every captured still image) or video. Additionally, although the device captures an image of the user's face, in other embodiments, the device can capture an image of any other body part (or distinguishable feature) of the user. Additionally, rather than allowing the device to capture an image of the user's face, the user may allow the device to capture an image of a picture identification card (e.g., a driver's license that has the user's image) associated with the user. Therefore, the image received by the device or the external server may be an image of the user from an identification card associated with the user.

As used herein, a device may be used interchangeably with "an application running on the device." Therefore, any functions or processes that are performed by the device may be performed by an application running on the device. Additionally, as used herein, "an application" may be used interchangeably with "a service" provided by a service provider (e.g., a host). The external server described herein may be associated with at least one of a particular device or a particular application. Additionally, as used herein, "a user" may be used interchangeably with "an account." A user may represent a single user or a group of users. A user may either be a human user or a virtual user.

Referring now to FIG. 1, FIG. 1 presents a process flow 100 for adapting content and monitoring user behavior based on facial recognition. The various process blocks presented in FIG. 1 may be executed in an order that is different from that presented in FIG. 1. At block 110, the process flow comprises receiving, at a first device, an image from a second device. At block 112, the process flow comprises determining whether the image substantially matches a second image in a database of images. At block 114, the process flow comprises in response to determining the image substantially matches the second image, determining an account associated with the image. At block 116, the process flow comprises determining a first set of data associated with the account. At block 118, the process flow comprises transmitting the first set of data to the second device, wherein the first set of data is used to configure an application being executed on the second device. The process described in FIG. 1 may be executed at least one of the device or the external server.

Referring now to FIG. 2, FIG. 2 presents another process flow 200 for adapting content and monitoring user behavior based on facial recognition. The various process blocks presented in FIG. 2 may be executed in an order that is different from that presented in FIG. 2. At block 210, the process flow comprises transmitting a facial image to a second device. At block 212, the process flow comprises in response to transmitting the facial image to the second device, receiving a first set of data from the second device, the second set of data being associated with an account associated with the facial image. At block 214, the process flow comprises configuring, based on the second set of data, an application being executed on the first device. The process described in FIG. 2 may be executed at least one of the device or the external server.

Referring now to FIG. 3, FIG. 3 is a diagram illustrating a front view of external components of an exemplary device (e.g., an image-capturing device). The image-capturing device illustrated in FIG. 3 is a mobile communication device (e.g., a mobile phone). In alternate embodiments, the image-capturing device may be any other computing device described herein. As illustrated in FIG. 3, image-capturing device 112 may include a housing 305, a microphone 310, a speaker 320, a display 350, and a camera button 360.

Housing 305 may include a structure configured to contain or at least partially contain components of image-capturing device 112. For example, housing 305 may be formed from plastic, metal or other natural or synthetic materials or combination(s) of materials and may be configured to support microphone 310, speaker 320, display 350, and camera button 360.

Microphone 310 may include any component capable of transducing air pressure waves to a corresponding electrical signal. For example, a user may speak into microphone 310 during a telephone call. Speaker 320 may include any component capable of transducing an electrical signal to a corresponding sound wave. For example, a user may listen to music through speaker 320.

The display 350 may function as a touchpad or touchscreen. Touchpad may include any component capable of providing input to device 112. Touchpad may include a standard telephone keypad or a QWERTY keypad. Touchpad may also include one or more special purpose keys. A user may utilize touchpad for entering information, such as text or a phone number, or activating a special function, such as placing a telephone call, playing various media, setting various camera features (e.g., focus, zoom, etc.) or accessing an application.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, image, and/or video information. Display 350 may also operate as a view finder, as will be described later. Camera button 360 may be a pushbutton that enables a user to take an image.

Since image-capturing device 112 illustrated in FIG. 3 is exemplary in nature, image-capturing device 112 is intended to be broadly interpreted to include any type of electronic device that includes an image-capturing component. For example, image-capturing device 112 may include a mobile phone, a personal digital assistant (PDA), a portable computer, a camera, or a watch. In other instances, image-capturing device 112 may include, for example, security devices or military devices. Accordingly, although FIG. 3 illustrates exemplary external components of image-capturing device 112, in other implementations, image-capturing device 112 may contain fewer, different, or additional external components than the external components depicted in FIG. 3. Additionally, or alternatively, one or more external components of image-capturing device 112 may include the capabilities of one or more other external components of image-capturing device 112. For example, display 350 may be an input component (e.g., a touch screen). The touch screen may function as a keypad or a touchpad. Additionally or alternatively, the external components may be arranged differently than the external components depicted in FIG. 3.

Referring now to FIG. 4, FIG. 4 is a diagram illustrating a rear view of external components of the exemplary image-capturing device. As illustrated, in addition to the components previously described, image-capturing device 112 may include a camera 470, a lens assembly 472, a proximity sensor 476, and a flash 474.

Camera 470 may include any component capable of capturing an image. Camera 470 may be a digital camera. Display 350 may operate as a view finder when a user of image-capturing device 112 operates camera 470. Camera 470 may provide for adjustment of a camera setting. In one implementation, image-capturing device 112 may include camera software that is displayable on display 350 to allow a user to adjust a camera setting.

Lens assembly 472 may include any component capable of manipulating light so that an image may be captured. Lens assembly 472 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 472 may be permanently fixed to camera 470. In other implementations, lens assembly 472 may be interchangeable with other lenses having different optical characteristics. Lens assembly 472 may provide for a variable aperture size (e.g., adjustable f-number).

Proximity sensor 476 (not shown in FIG. 4) may include any component capable of collecting and providing distance information that may be used to enable camera 470 to capture an image properly. For example, proximity sensor 476 may include a proximity sensor that allows camera 470 to compute the distance to an object. In another implementation, proximity sensor 476 may include an acoustic proximity sensor. The acoustic proximity sensor may include a timing circuit to measure echo return of ultrasonic soundwaves. In embodiments that include a proximity sensor 476, the proximity sensor may be used to determine a distance to one or more moving objects, which may or may not be in focus, either prior to, during, or after capturing of an image frame of a scene. In some embodiments, proximity of an object to the image-capturing device may be calculated during a post-processing step (e.g., after capturing the image).

Flash 474 may include any type of light-emitting component to provide illumination when camera 470 captures an image. For example, flash 474 may be a light-emitting diode (LED) flash (e.g., white LED) or a xenon flash. In another implementation, flash 474 may include a flash module.

Although FIG. 4 illustrates exemplary external components, in other implementations, image-capturing device 112 may include fewer, additional, and/or different components than the exemplary external components depicted in FIG. 4. For example, in other implementations, camera 470 may be a film camera. Additionally, or alternatively, depending on image-capturing device 112, flash 474 may be a portable flashgun. Additionally, or alternatively, image-capturing device 112 may be a single-lens reflex camera. In still other implementations, one or more external components of image-capturing device 112 may be arranged differently.

Referring now to FIG. 5, FIG. 5 is a diagram illustrating internal components of the exemplary image-capturing device. As illustrated, image-capturing device 112 may include microphone 310, speaker 320, display 350, camera button 360, camera 470, a memory 500, a transceiver 520, and a control unit 530. Additionally, the control unit 530 may enable a user to switch between touchpad mode 540 and display mode 550. In touchpad mode 540, the display 350 functions as at least one of an input device (e.g., a numeric keypad or a QWERTY touchpad) or an output device. In display mode 550, the display 350 functions as an output device.

Memory 500 may include any type of storing component to store data and instructions related to the operation and use of image-capturing device 112. For example, memory 500 may include a memory component, such as a random access memory (RAM), a read only memory (ROM), and/or a programmable read only memory (PROM). Additionally, memory 500 may include a storage component, such as a magnetic storage component (e.g., a hard drive) or other type of computer-readable or computer-executable medium. Memory 500 may also include an external storing component, such as a Universal Serial Bus (USB) memory stick, a digital camera memory card, and/or a Subscriber Identity Module (SIM) card.

Memory 500 may include a code component 510 that includes computer-readable or computer-executable instructions to perform one or more functions. These functions include initiating and/or executing the processes described herein. The code component 510 may work in conjunction with one or more other hardware or software components associated with the image-capturing device 112 to initiate and/or execute the processes described herein. Additionally, code component 510 may include computer-readable or computer-executable instructions to provide other functionality other than as described herein.

Transceiver 520 may include any component capable of transmitting and receiving information wirelessly or via a wired connection. For example, transceiver 520 may include a radio circuit that provides wireless communication with a network or another device.

Control unit 530 may include any logic that may interpret and execute instructions, and may control the overall operation of image-capturing device 112. Logic, as used herein, may include hardware, software, and/or a combination of hardware and software. Control unit 530 may include, for example, a general-purpose processor, a microprocessor, a data processor, a co-processor, and/or a network processor. Control unit 530 may access instructions from memory 500, from other components of image-capturing device 112, and/or from a source external to image-capturing device 112 (e.g., a network or another device).

Control unit 530 may provide for different operational modes associated with image-capturing device 112. Additionally, control unit 530 may operate in multiple modes simultaneously. For example, control unit 530 may operate in a camera mode, a music player mode, and/or a telephone mode. For example, when in camera mode, face-detection and tracking logic may enable image-capturing device 112 to detect and track multiple objects (e.g., the presence and position of each object's face) within an image to be captured. The face-detection and tracking capability of image-capturing device 112 will be described in greater detail below.

Although FIG. 5 illustrates exemplary internal components, in other implementations, image-capturing device 112 may include fewer, additional, and/or different components than the exemplary internal components depicted in FIG. 5. For example, in one implementation, image-capturing device 112 may not include transceiver 520. In still other implementations, one or more internal components of image-capturing device 112 may include the capabilities of one or more other components of image-capturing device 112. For example, transceiver 520 and/or control unit 530 may include their own on-board memory.

Referring now to FIG. 6, FIG. 6 is a diagram illustrating components of the exemplary camera depicted in FIG. 5. FIG. 6 illustrates lens assembly 472, proximity sensor 476, an iris/diaphragm assembly 616, a shutter assembly 618, a zoom lens assembly 620, an image sensor 622, and a luminance sensor 624.

Iris/diaphragm assembly 616 may include any component providing an aperture. Iris/diaphragm assembly 616 may be a thin, opaque, plastic structure with one or more apertures. This iris/diaphragm assembly 616 may reside in a light path of lens assembly 472. Iris/diaphragm assembly 616 may include different size apertures. In such instances, iris/diaphragm assembly 616 may be adjusted to provide a different size aperture. In other implementations, iris/diaphragm assembly 616 may provide only a single size aperture.

Shutter assembly 618 may include any component for regulating a period of time for light to pass through iris/diaphragm assembly 616. Shutter assembly 618 may include one or more shutters (e.g., a leaf or a blade). The leaf or blade may be made of, for example, a metal or a plastic. In one implementation, multiple leaves or blades may rotate about pins so as to overlap and form a circular pattern. In one implementation, shutter assembly 618 may reside within lens assembly 472 (e.g., a central shutter). In other implementations, shutter assembly 618 may reside in close proximity to image sensor 622 (e.g., a focal plane shutter). Shutter assembly 618 may include a timing mechanism to control a shutter speed. The shutter speed may be adjustable.

Zoom lens assembly 620 may include lens elements to provide magnification and focus of an image based on the relative position of the lens elements. Zoom lens assembly 620 may include fixed and/or movable lens elements. In one implementation, a movement of lens elements of zoom lens assembly 620 may be controlled by a servo mechanism that operates in cooperation with control unit 530.

Image sensor 622 may include any component to capture light. For example, image sensor 622 may be a charge-coupled device (CCD) sensor (e.g., a linear CCD image sensor, an interline CCD image sensor, a full-frame CCD image sensor, or a frame transfer CCD image sensor) or a Complementary Metal Oxide Semiconductor (CMOS) sensor. Image sensor 622 may include a grid of photo-sites corresponding to pixels to record light. A color filter array (CFA) (e.g., a Bayer color filter array) may be on image sensor 622. In other implementations, image sensor 622 may not include a color filter array. The size of image sensor 622 and the number and size of each pixel may vary depending on image-capturing device 112. Image sensor 622 and/or control unit 530 may perform various image processing, such as color aliasing and filtering, edge detection, noise reduction, analog to digital conversion, interpolation, compression, white point correction, etc.

Luminance sensor 624 may include any component to sense the intensity of light (i.e., luminance). Luminance sensor 624 may provide luminance information to control unit 530 so as to determine whether to activate flash 474. For example, luminance sensor 624 may include an optical sensor integrated circuit (IC).

Although FIG. 6 illustrates exemplary components, in other implementations, image-capturing device 112 may include fewer, additional, and/or different components than the exemplary components depicted in FIG. 6. For example, when image-capturing device 112 is a film camera, image sensor 622 may be film. Additionally, it is to be understood that variations may exist among different devices as to the arrangement, placement, number, adjustability, shape, material, etc., relating to the exemplary components described above. In still other implementations, one or more exemplary components of image-capturing device 112 may include the capabilities of one or more other components of image-capturing device 112. For example, lens assembly 472 may include zoom lens assembly 620.

As used herein, an "image" comprises a digital representation of one or more objects, which can include both animate and inanimate objects and/or one or more environmental elements or conditions. For example, an image may refer to an image of a user's face or any other body part, or combination thereof, of the user. In other embodiments, an image may refer to an image of one or more objects associated with the user. In still other embodiments, an image may refer to one or more environmental elements or conditions, such as the landscape. As used herein, "image data" comprises an aspect, characteristic, feature, ingredient, quality, and/or parameter of an image. Image data may refer to data associated with an image. For example, image data may comprise at least one measurement or determination associated with an image (e.g., a distance between eyes, a distance from an eye to a cheek, a skin complexion, a skin texture analysis, an eye color, a hair analysis, a contour of an eye socket, nose, or chin, or the like). Therefore, the image data may comprise information associated with a user's facial features (e.g., eye, nose, jaw, cheekbone, or the like). When an image comprises an image of a user's face, image data may also be referred to as face recognition data or face recognition parameters. In other embodiments, image data may additionally or alternatively refer to the image in its entirety and, in such instances, "image" and "image data" are used interchangeably. Therefore, image data may comprise at least one of an image or an aspect, characteristic, feature, ingredient, quality, and/or parameter of the image.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for configuring data, the method comprising:
    storing, in a computing device database, images of faces of users and user identification information that is associated with a corresponding image;
    capturing, by an image capturing device associated with a computing device, an image that includes more than one face, each face associated with a user;
    accessing, by a computing device processor, the database to determine that at least two of the faces in the captured image substantially match images of faces in the database;
    in response to determining that two or more of the faces substantially match images of faces in the database, identifying, by a computing device processor, the user identification information associated with the at least two faces in the captured image; and
    determining, by a computing device processor based on the identified user identification information, a plurality of first sets of data, each first set of data associated with a face in the captured image
    transmitting first set of data to the computing device, wherein each first set of data comprises preferences associated with each of the users associated with the two or more of the faces in the captured image.

2. The method of claim 1, wherein the plurality of first sets of data are transmitted to the computing device absent a requirement that one of the users input a username or an authentication credential to access an account associated with the first sets of data.

3. The method of claim 1, wherein the computing device comprises at least one of a television, a laptop computer, a smart screen, a tablet computer, a desktop computer, an electronic reader, a scanner, a portable media player, a mobile computing device, a mobile phone, a device at a movie theater, a gaming device, or a kiosk.

4. The method of claim 1, wherein capturing the image further comprises capturing, by the image capturing device, the image in response to one of (1) detecting a presence in view of an image capturing device associated with a computing device, (2) accessing, by a user, the computing device, or (3) initiating, by a user, an application associated with the preferences.

5. The method of claim 1, further comprising determining, by a computing device processor, a quality of the captured image is equal to or greater than a predetermined quality level.

6. The method of claim 1, further comprising, in response to determining that two or more of the faces substantially match images of faces in the database, transmitting, by a computing ice processor, a message to the computing device, the message prompting a user to confirm an account associated with the plurality of first sets of data.

7. The method of claim 1, wherein the plurality of first sets of data comprises a media consumption history for each of the corresponding users.

8. The method of claim 1, wherein the plurality of first sets of data comprises recommended media for each of the corresponding users.

9. The method of claim 1, further comprising:
    in response to determining that two or more of the faces substantially match images of faces in the database, transmitting, by a computing device processor, a message to the computing device, the message prompting a user to input an authentication credential;
    receiving, by a computing device processor, the authentication credential inputted by one of the users;
    determining, by a computing device processor, that the authentication credential is a correct authentication credential; and
    in response to determining the authentication credential is the correct authentication credential, transmitting, by a computing processor, a plurality of second sets of data to the computing device, wherein each second set of data is associated with a second tier of user preferences.

10. The method of claim 1, wherein the plurality of first sets of data are based on a type of the computing device.

11. The method of claim 1, wherein the database is associated with a service provider.

12. The method of claim 1, further comprising:
    receiving, by a computing device processor, data associated with user-specific activities the activity performed on the computing device;
    storing, in computing device memory, the received activity data,
    wherein the plurality of first sets of data is based on the received activity data.

13. The method of claim 12, wherein the received activity data is used to update a profile associated with an account associated with the plurality of first sets of data.

14. The method of claim 1, further comprising:
    determining, by a computing device processor, presence of users associated with the two or more faces in the captured image by monitoring an activity conducted on the computing device, and
    in response to determining that one of the users is no longer present after a period of time, recording the period of time.

15. The method of claim 14, further comprising:
    in response to determining that one of the users is no longer present, determining, by a computing device processor, that the one of the users is accessing the activity from the computing device or another computing device; and
    performing, by a computing device processor, a remainder of the activity on the computing device or the other computing device, the remainder of the activity being initiated at the recorded period of time.

16. A system for configuring data presented on a computing device, the system comprising:
    a database, stored at a server, the database configured to store images of faces of users and user identification information that is associated with a corresponding image;

an apparatus including a memory, and a processor in communication with the memory and; and a module stored in the memory, executable by the processor, and configured to:

capture, by an image capturing device associated with a computing device, an image that includes more than one face;

access the database to determine that at least two of the faces in the captured image substantially match images of faces in the database;

in response to determining that two or more of the faces substantially match images of faces in the database, identify the user information associated with the at least two faces in the captured image;

determine, based on the identified user identification information, a plurality of first sets of data, each first set of data associated with a face in the captured data; and transmit the plurality of first sets of data to the computing device, wherein each first set of data comprises preferences associated with each of the users associated with the two or more of the faces in the captured image.

17. A method for configuring data presented on a computing device, the method comprising:

storing, in a computing device database, images of faces of users and user identification information that is associated with a corresponding image;

transmitting, from a computing device to the database, information associated with user activities performed on the computing device;

capturing, by an image capturing device associated with the computing device, an image that includes more than one face;

accessing, by a computing device processor, the database to determine that at least two of the faces in the captured image substantially match images of faces in the database;

in response to determining that two or more of the faces substantially match images of faces in the database, receiving, at the computing device, a first set of data associated with an account held by at least one of the users associated with a face that substantially matches an image of a face in the database, wherein the first set of data is based on the information associated with the user activities performed on the computing device; and configuring, based on the first set of data, an application being executed on the first device.

18. The system of claim 16, wherein the module is further configured to transmit the plurality of first sets of data absent a requirement that one of the users input a username or an authentication credential to access an account associated with the first sets of data.

19. The system of claim 16, wherein the module is further configured to:

determine presence of users associated with the two or more faces in the captured image by monitoring an activity conducted on the computing device, and in response to determining that one of the users is no longer present after a period of time, record the period of time.

20. The system of claim 19, wherein the module is further configured to:

in response to determining that one of the users is no longer present, determine that the one of the users is accessing the activity from the computing device or another computing device; and performing, by a computing device processor, a remainder of the activity on the computing device or the other computing device, the remainder of the activity being initiated based on the recorded period of time.

\* \* \* \* \*